US008607190B2

(12) United States Patent
Coldicott et al.

(10) Patent No.: US 8,607,190 B2
(45) Date of Patent: Dec. 10, 2013

(54) AUTOMATION OF SOFTWARE APPLICATION ENGINEERING USING MACHINE LEARNING AND REASONING

(75) Inventors: Peter Alan Coldicott, Lago Vista, TX (US); Raymond Walter Ellis, Austin, TX (US); Celso Gonzalez, Coquitlam, CA (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 12/604,751

(22) Filed: Oct. 23, 2009

(65) Prior Publication Data

US 2011/0099532 A1 Apr. 28, 2011

(51) Int. Cl.
*G06F 9/44* (2006.01)
*G06F 7/00* (2006.01)

(52) U.S. Cl.
USPC ........... 717/105; 717/104; 717/106; 717/107; 717/108; 717/115; 707/793; 707/795; 707/796; 707/803

(58) Field of Classification Search
None
See application file for complete search history.

(56) References Cited

U.S. PATENT DOCUMENTS

| | | | |
|---|---|---|---|
| 5,970,490 A * | 10/1999 | Morgenstern | 1/1 |
| 6,256,773 B1 | 7/2001 | Bowman-Amuah | |
| 6,539,396 B1 | 3/2003 | Bowman-Amuah | |
| 6,658,644 B1 | 12/2003 | Bishop et al. | |
| 6,799,174 B2 | 9/2004 | Chipman et al. | |
| 7,080,064 B2 | 7/2006 | Sundaresan | |
| 7,099,859 B2 | 8/2006 | Sundaresan | |
| 7,103,871 B1 | 9/2006 | Kirkpatrick et al. | |
| 7,225,241 B2 | 5/2007 | Yada | |
| 7,318,055 B2 | 1/2008 | Britton et al. | |
| 7,366,706 B2 | 4/2008 | Chang et al. | |
| 7,412,457 B2 | 8/2008 | Saracco et al. | |
| 7,483,973 B2 | 1/2009 | An et al. | |

(Continued)

FOREIGN PATENT DOCUMENTS

WO 2007113164 10/2007

OTHER PUBLICATIONS

Justin Kelleher, "A Reusable Traceability Framework Using Patterns", University of Cape Town, ACM Digital Library, 2005, pp. 50-55.

(Continued)

*Primary Examiner* — Henry Tsai
*Assistant Examiner* — Michael Sun
(74) *Attorney, Agent, or Firm* — Patents on Demand P.A.; Brian K. Buchheit; Scott M. Garrett

(57) ABSTRACT

A system for automatically creating a desired software application design. In response to an input to create a desired software application design, functional requirements for the desired software application design are retrieved. Then, non-functional requirements associated with each retrieved functional requirement are retrieved. In addition, software models associated with the retrieved functional requirements are retrieved. Further, software patterns associated with the retrieved non-functional requirements are retrieved. Then, the retrieved software models are transformed into software code for the desired software application design. Also, the retrieved software patterns are applied to associated code sequences in the software code to automatically create an architecture for the desired software application design. Finally, the architecture for the desired software application design is outputted for use by a user. The decisions made during the software application design process are also captured for analysis for future improvement of the desired software application design.

20 Claims, 3 Drawing Sheets

(56) References Cited

U.S. PATENT DOCUMENTS

| | | | |
|---|---|---|---|
| 7,526,501 B2 | 4/2009 | Albahari et al. | |
| 7,546,295 B2 | 6/2009 | Brave et al. | |
| 7,630,877 B2 * | 12/2009 | Brown et al. | 703/21 |
| 7,890,517 B2 | 2/2011 | Angelo et al. | |
| 7,979,840 B2 | 7/2011 | Zhang et al. | |
| 8,346,929 B1 * | 1/2013 | Lai | 709/226 |
| 2002/0069102 A1 | 6/2002 | Vellante et al. | |
| 2002/0073106 A1 | 6/2002 | Parker et al. | |
| 2002/0129329 A1 * | 9/2002 | Nishioka et al. | 717/104 |
| 2002/0194053 A1 | 12/2002 | Barrett et al. | |
| 2003/0009740 A1 | 1/2003 | Lan | |
| 2003/0233631 A1 | 12/2003 | Curry et al. | |
| 2004/0172612 A1 | 9/2004 | Kasravi et al. | |
| 2004/0193476 A1 | 9/2004 | Aerdts | |
| 2005/0044197 A1 * | 2/2005 | Lai | 709/223 |
| 2005/0050311 A1 | 3/2005 | Joseph et al. | |
| 2005/0050549 A1 | 3/2005 | Joseph et al. | |
| 2005/0114829 A1 * | 5/2005 | Robin et al. | 717/101 |
| 2005/0138113 A1 | 6/2005 | Brendle et al. | |
| 2005/0154769 A1 * | 7/2005 | Eckart et al. | 707/201 |
| 2005/0166178 A1 | 7/2005 | Masticola et al. | |
| 2005/0182744 A1 * | 8/2005 | Kawabata et al. | 707/1 |
| 2005/0278202 A1 | 12/2005 | Broomhall et al. | |
| 2006/0015489 A1 | 1/2006 | Probst et al. | |
| 2006/0047810 A1 | 3/2006 | Herzog et al. | |
| 2006/0070083 A1 | 3/2006 | Brunswig et al. | |
| 2006/0174222 A1 | 8/2006 | Thonse et al. | |
| 2006/0229896 A1 | 10/2006 | Rosen et al. | |
| 2006/0236307 A1 * | 10/2006 | Debruin et al. | 717/117 |
| 2006/0241931 A1 | 10/2006 | Abu el Ata et al. | |
| 2007/0043632 A1 * | 2/2007 | Abelow | 705/27 |
| 2007/0073663 A1 | 3/2007 | McVeigh et al. | |
| 2007/0112712 A1 | 5/2007 | Flinn et al. | |
| 2007/0239768 A1 | 10/2007 | Quinn-Jacobs | |
| 2007/0261027 A1 | 11/2007 | Dhanakshirur et al. | |
| 2007/0271277 A1 | 11/2007 | Ivan et al. | |
| 2008/0059630 A1 | 3/2008 | Sattler et al. | |
| 2008/0114700 A1 | 5/2008 | Moore et al. | |
| 2008/0126397 A1 | 5/2008 | Alexander et al. | |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetain et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0270372 A1 | 10/2008 | Hsu et al. | |
| 2008/0288944 A1 | 11/2008 | Coqueret et al. | |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 * | 5/2009 | Lane et al. | 705/7 |
| 2009/0150860 A1 * | 6/2009 | Gschwind et al. | 717/104 |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0210390 A1 | 8/2009 | Lane | |
| 2010/0082387 A1 * | 4/2010 | Cao et al. | 705/7 |
| 2010/0106656 A1 | 4/2010 | Sheth et al. | |
| 2010/0161629 A1 | 6/2010 | Palanisamy et al. | |
| 2011/0035391 A1 | 2/2011 | Werner et al. | |
| 2011/0099050 A1 | 4/2011 | Coldicott et al. | |
| 2011/0153292 A1 | 6/2011 | Lane et al. | |
| 2011/0153293 A1 | 6/2011 | Coldicott et al. | |
| 2011/0153608 A1 | 6/2011 | Lane et al. | |
| 2011/0153610 A1 | 6/2011 | Carrato et al. | |
| 2011/0153767 A1 | 6/2011 | Coldicott et al. | |
| 2011/0238610 A1 | 9/2011 | Lee et al. | |

OTHER PUBLICATIONS

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

Lee, J. et al.; "Semantic and Dynamic Web Service of SOA based Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2", Aug. 28, 2006.

Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F", Aug. 28, 2006.

Building SOA applications with reusable assets, Part 3: WS response template pattern, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2F", Mar. 29, 2007.

"System and Method for Distributed Web Service Adaptation using Aspect Oriented Programming",IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

\* cited by examiner

AUTOMATION OF SOFTWARE APPLICATION ENGINEERING USING MACHINE LEARNING AND REASONING

BACKGROUND OF THE INVENTION

1. Field of the Invention

The present invention relates generally to an improved data processing system and more specifically to a computer implemented method, system, and computer usable program code for automatically creating a software application design utilizing reusable software assets based on machine learning and reasoning.

2. Description of the Related Art

The use of service-oriented architecture (SOA) environments and information services is fast becoming the preferred implementation for enterprise systems. Using SOA, an enterprise may be visualized as a collection of loosely coupled building blocks, called information services or business services. Information services provide a discrete business function, such as, for example, checking credit, opening an account, and so on, that can be adapted to a particular business context. As a business expands its enterprise capabilities, more information services are added to the network to accommodate the expansion. However, the design and development of information services is an error-prone, manual process, which relies heavily upon the skill and experience of a designer known as a solution architect. Because this software design process depends upon a human element, the information services within an enterprise system may lack consistency.

In addition, many enterprises are very good at producing, developing, and harvesting information technology (IT) assets, but are very poor and unsuccessful at consuming or reusing these IT assets. Two of the potentially most useful types of IT assets in software development are software models and software patterns. A key to successful software engineering when architecting, designing, and building software applications, such as, for example, SOA solutions, lies in developing a robust and appropriate architecture for the information services and applications that comprise a business solution. Primarily due to the inherent complexity involved in understanding the specific requirements and fit for a given software architecture, this long and difficult process of engineering software architectures has seen little application of reusable IT assets and instead has been uniquely developed for each new business scenario.

BRIEF SUMMARY OF THE INVENTION

According to one embodiment of the present invention, a desired software application design is automatically created. In response to an input to create the desired software application design, functional requirements for the desired software application design are retrieved. Then, non-functional requirements associated with each retrieved functional requirement are retrieved. In addition, software models associated with the retrieved functional requirements are retrieved. Further, software patterns associated with the retrieved non-functional requirements are retrieved. Then, the retrieved software models are transformed into software code for the desired software application design. Also, the retrieved software patterns are applied to associated code sequences in the software code to automatically create an architecture for the desired software application design. Finally, the architecture for the desired software application design is outputted for use by a user. The decisions made during the software application design process are also captured for analysis for future improvement of the desired software application design.

DETAILED DESCRIPTION OF THE INVENTION

Figure 1:
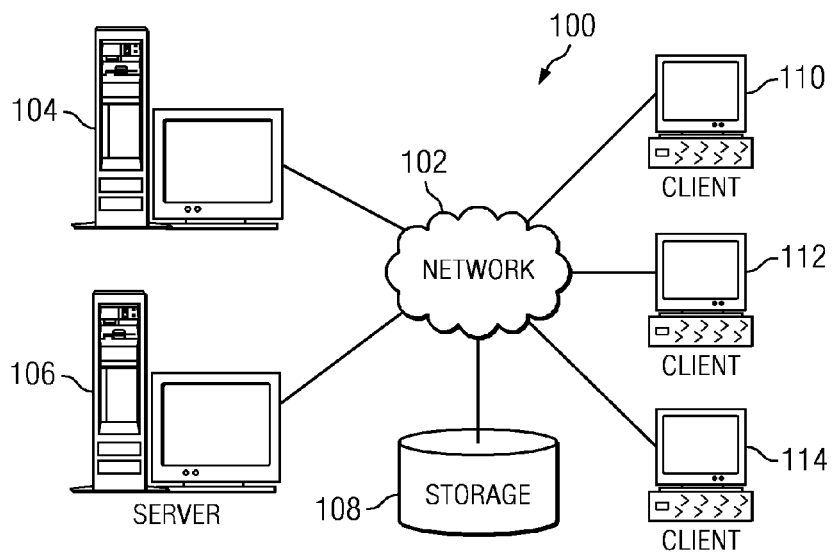
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, a software embodiment (including firmware, resident software, microcode, etc.) stored in a storage device, or an embodiment combining software and hardware aspects that may all generally be referred to herein as a "circuit," "module," or "system." Furthermore, the present invention may take the form of a computer program product embodied in any storage device having computer readable program code embodied in the medium. A storage device for storing computer readable program code does not encompass a signal propagation media such as copper cable, optical fiber or wireless transmission media.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
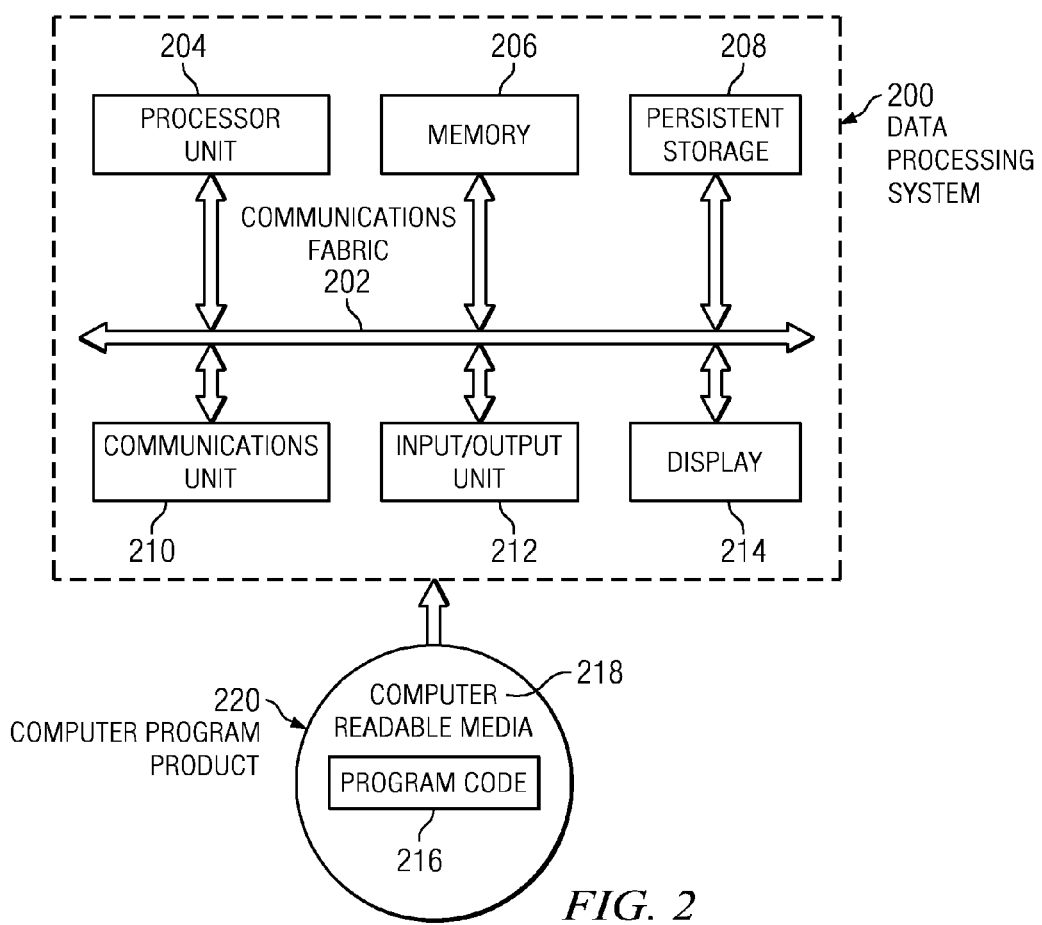
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communication links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be any database within an enterprise that stores and manages reusable software assets and any other data related to these reusable software assets. In addition, storage 108 may be a standards-based business service repository that captures information regarding business services, business policies, and service subscribers.

Client devices 110, 112, and 114 also connect to network 102. Client devices 110, 112, and 114 may, for example, be personal computers, network computers, laptop computers, handheld computers, personal digital assistants (PDAs), or smart cellular telephones. Users, such as solution architects, may utilize client devices 110, 112, and 114 to automatically create software application designs for an enterprise using the reusable software assets stored in storage 108. Client devices 110, 112, and 114 are clients to server 104 and/or server 106 in this example. In addition, server 104 and/or server 106 may provide data, such as, for example, boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments. For example, illustrative embodiments may be implemented within a single data processing system instead of within a network data processing system.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer-recordable storage media.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communication links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for automatically creating an optimized architecture for a software application design by using reusable software assets. Thus, illustrative embodiments by automating the selection and integration of reusable software assets into the software engineering process, leverage and increase the level of software asset consumption, while at the same time, provide improved architectural consistency, traceability, and accountability. In addition, illustrative embodiments provide improved architectural quality of the resulting software applications. This improved architectural consistency, traceability, accountability, and quality of resulting software applications is achieved by mapping functional requirements for software application designs to reusable software model assets and mapping non-functional requirements for those software application designs to reusable software pattern assets. Then, the appropriate transformations are applied to the selected software model assets and software pattern assets for the software application designs to create architecturally sound and consistent business services and applications. Decisions made during the software application design process are captured for future improvement analysis of software application designs.

Illustrative embodiments provide the right software assets, which is the content, to help solve the problem at hand, which is the context. The context is provided by the scope of the software project and by the functional and non-functional requirements for that software project. The scope of a software project may be determined by the industry, such as, for example, the insurance industry, financial industry, healthcare industry, retail industry, and so on, selected for the software project. In addition, the scope of the software project may be determined by the architectural style, such as, for example, an SOA architectural style, a client/server architectural style, distributed computing architectural style, and so on, selected for the software project.

Illustrative embodiments automatically select the content, or software assets, which is relevant to the context or problem to be solved by the software application design project. For example, on an insurance industry software project, illustrative embodiments map a functional requirement of creating a claims system to a reusable software asset, such as a software model previously designed for a claims system. The software model may, for example, be written in a formal modeling language, such as Unified Modeling Language (UML), which describes in detail all aspects of the context.

A specific example of an insurance industry model is Insurance Application Architecture (IAA), a product developed by the International Business Machines Corporation. IAA is a set of information, process, and integration models that represent leading practice systems development in the insurance industry. IAA is an architectural blueprint with detailed insurance business content that can be applied to initiatives on an enterprise-wide or specific project basis.

In addition, illustrative embodiments map a non-functional requirement, such as a transactional claims process, to another type of reusable software asset, a software pattern, to provide a consistent architecture for the software application design. Thus, illustrative embodiments automate a context-to-content mapping to provide the best available software assets for a software application design.

Figure 3:
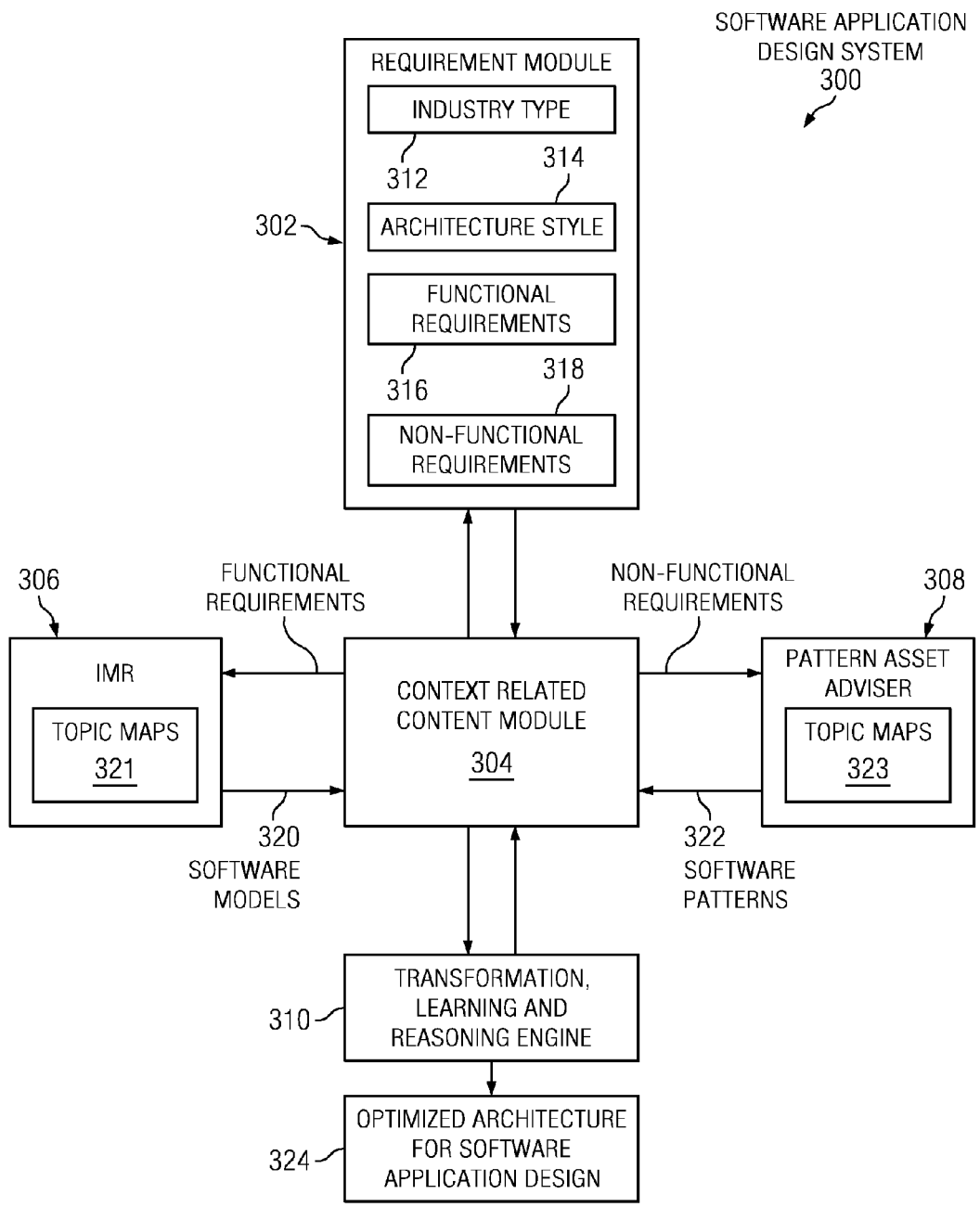
FIG. 3 is an exemplary illustration of a software application design system in accordance with an illustrative embodiment.

With reference now to FIG. 3, an exemplary illustration of a software application design system is depicted in accordance with an illustrative embodiment. Software application design system 300 may be implemented in a network of data processing systems, such as network data processing system 100 in FIG. 1. Alternatively, software application design system 300 may be implemented in a single data processing system, such as data processing system 200 in FIG. 2.

Software application design system 300 is a data processing system that includes a plurality of software components or modules that software application design system 300 uses to automatically create an optimized architecture for a software application design by using reusable software assets. Software application design system 300 includes requirement module 302, context related content module 304, industry model repository (IMR) 306, pattern asset adviser 308, and transformation, learning, and reasoning engine 310. However, it should be noted that software application design system 300 is only meant as an example and not intended as a limitation on different illustrative embodiments. In other words, software application design system 300 may include more or fewer components as necessary to accomplish processes of the different illustrative embodiments.

Requirement module 302 is a software application designed to capture and store design requirements, such as functional requirements and non-functional requirements, for one or more software application architectures. A requirement is a capability that a software application design must provide. Conformance to some set of requirements defines the success of a software application design project.

Requirement module 302 may capture and store published standards-based service components and composite business services, which customers and business partners may discover and use in their own business processes. Businesses may build on each other's services, creating new loosely coupled, process-centric and industry-centric business service ecosystems. As a result, requirement module 302 may significantly reduce the complexity, cost, and risk associated with traditional, large-scale enterprise software projects.

Requirement module 302 may, for example, be a commercially available system, such as Rational® RequisitePro®, a product available from the International Business Machines Corporation. Rational® RequisitePro® is a requirements management tool that organizes and documents project requirements so that an enterprise can manage software application design change and provides for collaborative development of software application design.

Requirement module 302 includes industry type 312, architectural style 314, functional requirements 316, and non-functional requirements 318. Industry type 312 defines the type of industry, such as, for example, the insurance, financial, healthcare, or retail industry, associated with a particular software application design project. Industry type 312 may represent one or more industry types that a solution architect may select from to start a particular software application design project.

Architectural style 314 defines the architectural style, such as, for example, an SOA, client/server, or distributed computing architectural style, for the particular software application design project. Architectural style 314 may represent one or more architectural styles that the solution architect may select from after selecting the industry type for the software application design project.

Software application frameworks offer sets of reusable and adaptable components embedded within an architecture optimized for a given target domain. A software asset is a collection of artifacts that provide a solution to a problem in a particular context, such as a requirement, a design model, implementation code, or a test case. A software asset generally refers to a set of one or more related artifacts that have been created or harvested for the purpose of applying the asset repeatedly in subsequent software development environments. Source code and binary code are examples of artifacts adapted for use with the software assets. Other examples of artifacts include related documentation, such as requirement specifications, design documents, operation manuals, and the like. Additional examples of artifacts include models, such as process models, structural models, resource models, implementation models, and so forth, which may additionally include object models, collaboration diagrams, deployment models, etc.

Reusable software assets may be utilized to address both functional and nonfunctional requirements of a software application design. Functional requirements 316 define what a particular piece of software can be expected to accomplish within a particular context. Functional requirements 316 may represent a set of one or more functional requirements for a particular software application design. In addition, functional requirements 316 may represent a plurality of functional requirements for a plurality of software application designs.

Non-functional requirements 318 define global constraints that must be satisfied by the software application design. These global constraints, also known as software global attributes, typically include performance, fault-tolerance, availability, scalability, transactionality, and security constraints. In other words, non-functional requirements 318 define how the software application design is built within a particular context.

During a software development process, functional requirements 316 are incorporated into software artifacts and are implemented in such a manner that the software satisfies the functional requirements for the software application design. However, non-functional requirements 318 are not implemented in the same manner as functional requirements 316. Non-functional requirements 318 are more complex to deal with and are usually very abstract. In addition, non-functional requirements 318 may conflict with each other.

Context related content module 304 is the software component that relates the context of a software application design to the appropriate content. For example, the context of a software application design may be driving a car. As a result, the related content may, for example, be maps, destination, driving conditions, weather, points of interest, etc., for that particular context. Context related content module 304 receives industry type 312, architectural style 314, functional requirements 316, and non-functional requirements 318 for a desired optimal software application design. Then, context related content module 304 sends functional requirements 316 to IMR 306 and non-functional requirements 318 to pattern asset adviser 308.

Industry model repository (IMR) 306 provides the ability to automatically select software models 320 based on functional requirements 316 for the desired software application design. For example, based on an input requirement for a reservation service for a car rental company, IMR 306 automatically selects relevant software models 320, such as a use case model for a reservation, a business process model, a service model, a domain model, and a data model, all related to creating the reservation system. Consequently, IMR 306 must manage and maintain complex associations between functional requirements and the reusable software models.

It should be noted that IMR 306 may be implemented as a relational database. Moreover, IMR 306 includes topic maps 321. IMR 306 may use topic maps 321, for example, to maintain the complex associations between functional requirements and the reusable software models needed to satisfy those functional requirements. Topic maps are an ISO standard for the representation and interchange of knowledge, with an emphasis on the findability of information. The ISO standard is formally known as ISO/IEC 13250:2003. Topic maps are a way to build standard indexes.

A topic map represents information using topics that may represent any concept from people, countries, and organizations to software modules, individual files, and events. In this case, a topic may be a functional requirement, a non-functional requirement, a software model, or a software pattern. In other words, illustrative embodiments may use a topic map to model relationships between software requirements, which include functional and non-functional requirements, and necessary reusable software assets, which include software models and patterns, needed to satisfy those software requirements.

Associations between the topics within the topic map represent how topics relate to one another. In addition, the topic map maintains occurrences of the topics that represent where the topics may be found, such as a Webpage, a uniform resource locator (URL), or a reference within a book. Thus, topic maps are similar to semantic networks, concept maps, and mind maps.

Pattern asset adviser 308 provides the ability to automatically select software patterns 322 or combinations of software patterns based on non-functional requirements 316 for the desired software application design. Using the car rental company example above, the functional requirement to create a reservation service will have a corresponding non-functional requirement that the reservation service meet specific performance levels. Thus, pattern asset adviser 308 maps the performance non-functional requirement to an associated software pattern.

In general, a software pattern refers to a set of related artifacts that have been created or harvested for the purpose of applying that software pattern repeatedly in subsequent development environments. A software pattern represents a repeatable solution to a problem in a particular context. As a result, software patterns 322, which are selected by pattern asset adviser 308 based on non-functional requirements 318 for the desired software application design, determine how the software application design solves the problem within the particular context.

Software pattern assets are often represented by a pattern specification and/or pattern implementation. Hence, consistency, traceability, and accountability may be achieved by mapping non-functional requirements 318 to the software patterns 322. Pattern asset adviser 308 may utilize topic maps 323 to maintain the complex associations between non-functional requirements and the reusable software patterns needed to satisfy those non-functional requirements.

Transformation, learning, and reasoning engine 310 receives industry type 312, architectural style 314, software models 320, and software patterns 322 for the desired software application design from context related content module 304. Transformation, learning, and reasoning engine 310 provides the ability to automatically apply a series of rules to selected software models 320 and selected software patterns 322 for the context to drive development transformations in a correct sequence and iteration to obtain an optimal end software application design, such as optimized architecture for software application design 324, by leveraging machine learning and reasoning. An example of a development transformation rule may, for example, be as follows: reusable assets A, which are utilized to satisfy requirement type A, may be used together with reusable assets B, which are utilized to satisfy requirement type B. After development transformation when requirement type A and B exist, then a relationship now exists linking reusable assets A to reusable assets B to denote that reusable assets A and B should be used together.

Transformation, learning, and reasoning engine 310 may, for example, be a commercially available product, such as Agent Building and Learning Environment (ABLE), which is available from the International Business Machines Corporation.

ABLE is a Java™ framework, component library, and productivity tool kit for building intelligent agents using machine learning and reasoning. The ABLE framework provides a set of Java™ interfaces and base classes used to build a library of JavaBeans™ called AbleBeans. Java and all Java-based trademarks and logos are trademarks of Sun Microsystems, Inc. in the United States, other countries, or both. The library includes AbleBeans for reading and writing text and database data, for data transformation and scaling, for rule-based inferencing using Boolean and fuzzy logic, and for machine learning techniques, such as neural networks, Bayesian classifiers, and decision trees. Rule sets created using the ABLE Rule Language may be used by any of the provided inferencing engines, which range from simple if-then scripting to light-weight inferencing to heavy-weight artificial intelligence (AI) algorithms using pattern matching and unification.

Figure 4:
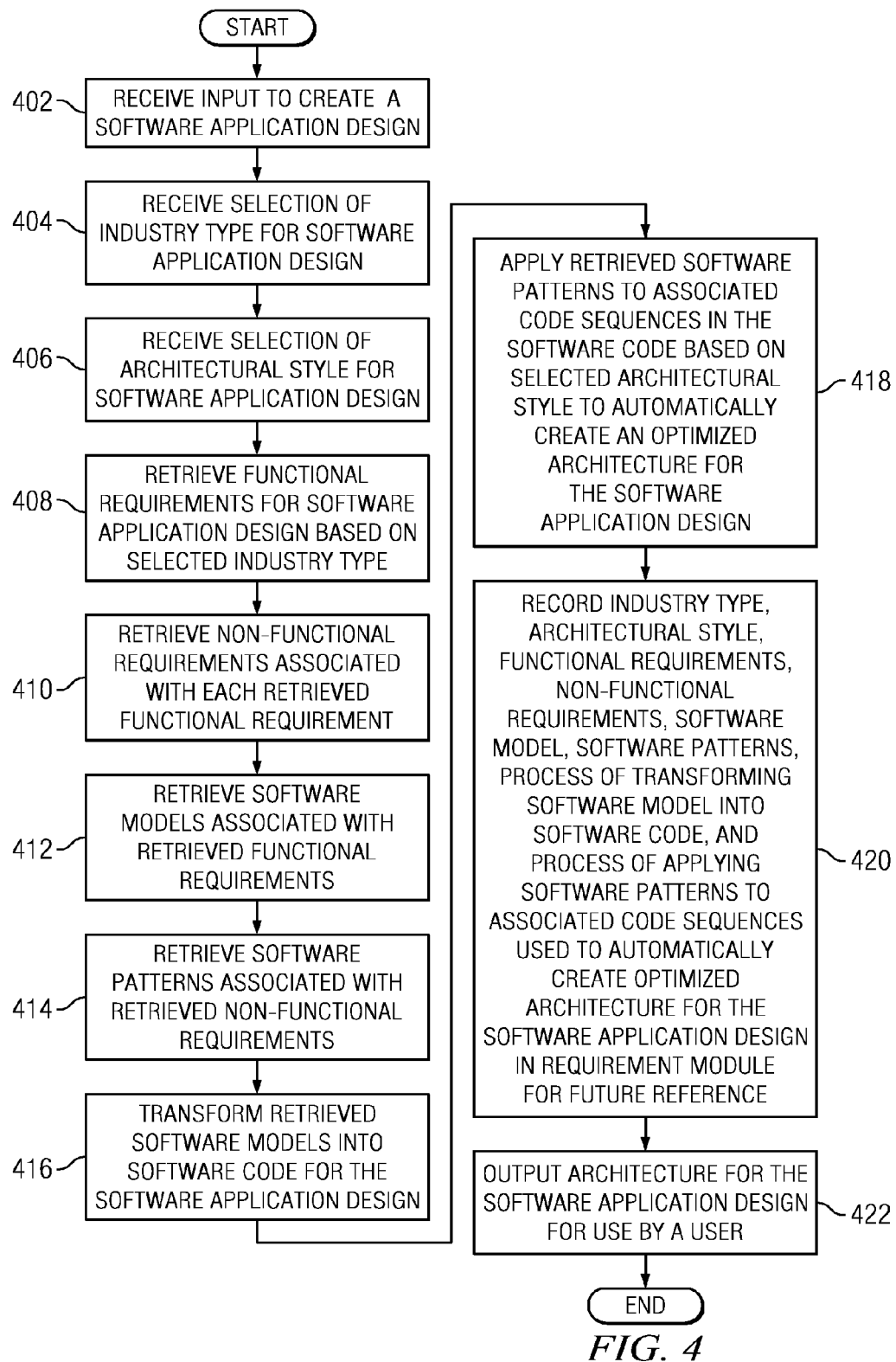
FIG. 4 is a flowchart illustrating an exemplary process for automatically creating a software application design in accordance with an illustrative embodiment.

With reference now to FIG. 4, a flowchart illustrating an exemplary process for automatically creating a software application design is shown in accordance with an illustrative embodiment. The process shown in FIG. 4 may be implemented in a software application design system, such as software application design system 300 in FIG. 3.

The process begins when the software application design system uses a requirement module, such as requirement module 302 in FIG. 3, to receive an input from a user, such as a solution architect, to create a software application design utilizing reusable software assets (step 402). After receiving the input to create a desired optimal software application design in step 402, the requirement module then receives a selection by the user of an industry type, such as industry type 312 in FIG. 3, for the desired software application design (step 404). In addition, the requirement module also receives a selection by the user of an architectural style, such as architectural style 314 in FIG. 3, for the desired software application design (step 406).

Then, the requirement module retrieves any functional requirements, such as functional requirements 316 in FIG. 3, required for the desired software application design based on the selected industry type (step 408). Subsequent to retrieving the functional requirements for the software application design in step 408, the requirement module retrieves a set of one or more non-functional requirements, such as non-functional requirements 316 in FIG. 3, associated with each of the retrieved functional requirements (step 410). Then, the software application design system utilizes an IMR, such as IMR 306 in FIG. 3, to automatically retrieve software models, such as software models 320 in FIG. 3, which are associated with the retrieved functional requirements for the software application design (step 412).

Then, the software application design system utilizes a pattern asset adviser, such as pattern asset adviser 308 in FIG. 3, to automatically retrieve software patterns, such as software patterns 322 in FIG. 3, which are associated with the retrieved non-functional requirements (step 414). Then, the software application design system utilizes a transformation, learning, and reasoning engine, such as transformation, learning, and reasoning engine 310 in FIG. 3, to transform the retrieved software model into software code for the desired software application design (step 416). In addition, the transformation, learning, and reasoning engine applies the retrieved software patterns to their respective associated code sequences in the software code based on the selected architectural style to automatically create an optimized architure for the desired software application design, such as optimized architecture for the software application design 324 in FIG. 3 (step 418).

Afterward, the software application design system records the industry type, the architectural style, the functional requirements, the non-functional requirements, the software model, the software patterns, the process of transforming the software model into the software code, and the process of applying the software patterns to the associated code sequences used to automatically create the optimized architecture for the desired software application design in the requirement module for future reference (step 420). Subsequently, the software application design system outputs the optimized architecture for the desired software application design for use by the user (step 422). Thereafter, the process terminates.

Thus, illustrative embodiments of the present invention provide a computer implemented method, system, and computer program product for automatically creating an optimized architecture for a software application design using reusable software assets based on machine learning and reasoning. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating a computer program that reuses previously stored program components and satisfies quality requirements for an industry for which the computer program is targeted, the method comprising the steps of:
receiving a specification of an industry classification for the computer program, a specification of Service Oriented Architecture for the computer program, a plurality of functional requirements for the computer program, a requirement for performance level of the computer program, a requirement for fault-tolerance of the computer program and a requirement for scalability of the computer program;

determining, by one or more processors, one or more of the program components that implement the plurality of functional requirements;

determining, by one or more processors, one or more combinations of the previously stored program components that include the one or more program components implement the functional requirements, are interconnected by Service Oriented Architecture, and satisfy the requirements for (a) performance level of the computer program corresponding to the industry classification, (b) fault-tolerance of the computer program corresponding to the industry classification, and (c) scalability of the computer program corresponding to the industry classification.

2. The method of claim 1, further comprising:
receiving a selection of an industry type for the desired software application design, wherein the industry type is a component of the industry classification; and
receiving a selection of an architectural style for the desired software application design, wherein the architectural style is a style of the Service Oriented architecture.

3. The method of claim 1, wherein the receiving also receives a requirement for security constraints of the computer program, wherein the determining of the combinations of program components also satisfy the security constraints.

4. The method of claim 1, further comprising;
automatically creating a software architecture for the computer program by applying the determined combinations of the program components, wherein the automatically created software architecture satisfies the received functional requirements and satisfies the requirements for (a) performance level, (b) fault-tolerance and (c) scalability of the computer program.

5. The method of claim 1, wherein software patterns are implemented for determining the performance level, (b) fault-tolerance and (c) scalability, wherein the software patterns refer to a manner in which the program components interconnect, wherein different interconnections of the program components result in different characteristics for performance, fault tolerance, and scalability of a resulting computer program, wherein the software patterns represent repeatable solutions implemented repeatedly in different development environments, wherein performance level, fault tolerance, and scalability values for the software patterns utilized in the determining step of the method are computed using storage values discerned from historical implementations of these software patterns in the different development environments.

6. The method of claim 1, further comprising:
utilizing a topic map to maintain database associations between functional requirements and software patterns used to satisfy requirements for (a) performance level, (b) fault-tolerance, and (c) scalability of the computer program, wherein the topic map complies with an International Organization for Standardization (ISO) standard for topic maps.

7. The method of claim 1, further comprising:
outputting the computer program that is automatically created from the program combinations of the program components.

8. The method of claim 1, wherein the functional requirements are based on the selected industry type.

9. The method of claim 1, wherein determinations that the requirements for performance level, fault-tolerance, and scalability of the computer program are satisfied is determined from a combination of associated code sequences in software code for the computer program based on a specified architectural style of the Service Oriented Architecture.

10. The method of claim 1, wherein a transformation, learning, and reasoning engine uses a series of rules to determine whether the requirements for performance level, fault-tolerance, and scalability of the computer program are satisfied.

11. The method of claim 1, further comprising:
creating, by one or more processors, at least a portion of the computer program by automatically combining the determined combinations of program components.

12. The method of claim 1, wherein determined program components are reusable software assets.

13. The method of claim 1, wherein the functional requirements define what the computer program is expected to accomplish within a particular context.

14. The method of claim 1, further comprising:
defining, by one or more processors, global constraints that must be satisfied by the computer program, and wherein the determined combinations of program components satisfy the global constraints when interconnected by the Service Oriented Architecture.

15. The method of claim 1, wherein a software pattern represents a repeatable solution to a problem in a particular context, wherein the software pattern is used for determining combinations of the program components that satisfy the performance level, the fault-tolerance, and the scalability of the computer program.

16. A data processing system for generating a computer program that reuses previously stored program components and satisfies quality requirements for an industry for which the computer program is targeted, comprising:
a bus system;
a computer-readable storage device connected to the bus system, and a set of program instructions stored on the storage device; and
a processing unit connected to the bus system, wherein the processing unit executes the set of program instructions to;
receive a specification of an industry classification for the computer program, a specification of Service Oriented Architecture for the computer program, a plurality of functional requirements for the computer program, a requirement for performance level of the computer program, a requirement for fault-tolerance of the computer program and a requirement for scalability of the computer program;
determine one or more of the program components that implement the plurality of functional requirements;
determine one or more combinations of the program components that include the one or more program components and implement the functional requirements, are interconnected by Service Oriented Architecture, and
satisfy the requirements for (a) performance level of the computer program corresponding to the industry classification, (b) fault-tolerance of the computer program corresponding to the industry classification, and (c) scalability of the computer program corresponding to the industry classification.

17. A computer program product stored in a non-transitory computer-readable storage device and computer readable program code stored on the storage device generating a computer program that reuses previously stored program components and satisfies quality requirements for an industry for which the computer program is targeted, the computer readable program code comprising:
- computer readable program code to receive a specification of an industry classification for the computer program, a specification of Service Oriented Architecture for the computer program, a plurality of functional requirements for the computer program, a requirement for performance level of the computer program, a requirement for fault-tolerance of the computer program and a requirement for scalability of the computer program;
- computer readable program code to determine, by one or more processors, one or more of the program components that implement the plurality of functional requirements;
- computer readable program code to determine, by one or more processors, one or more combinations of the program components that include the one or more program components and implement the functional requirements, are interconnected by Service Oriented Architecture, and
- computer readable program code to satisfy the requirements for (a) performance level of the computer program corresponding to the industry classification, (b) fault-tolerance of the computer program corresponding to the industry classification, and (c) scalability of the computer program corresponding to the industry classification.

18. The computer program product of claim 17, further comprising:
- computer readable program code to receive a selection of an industry type for the desired software application design, wherein the industry type is a component of the industry classification; and
- computer usable program code configured to receive a selection of an architectural style for the desired software application design, wherein the architectural style is a style of the Service Oriented architecture.

19. The computer program product of claim 17, wherein the computer readable program code to receive receives a requirement for security constraints of the computer program, wherein the computer readable program code to determine the combinations of program components also satisfy the security constraints.

20. The computer program product of claim 17, further comprising;
- computer readable program code to automatically create a software architecture for the computer program by applying the determined combinations of the program components, wherein the automatically created software architecture satisfies the received functional requirements and satisfies the requirements for (a) performance level, (b) fault-tolerance and (c) scalability of the computer program.

* * * * *